(12) United States Patent
Kim

(10) Patent No.: US 6,868,458 B2
(45) Date of Patent: Mar. 15, 2005

(54) COMMUNICATION SYSTEM FOR RAISING CHANNEL UTILIZATION RATE AND COMMUNICATION METHOD THEREOF

(75) Inventor: Jung-hyun Kim, Yongin (KR)

(73) Assignee: Samsung Electronics Co., Ltd. (KR)

( * ) Notice: Subject to any disclaimer, the term of this patent is extended or adjusted under 35 U.S.C. 154(b) by 203 days.

(21) Appl. No.: 10/062,873

(22) Filed: Jan. 31, 2002

(65) Prior Publication Data

US 2002/0161943 A1 Oct. 31, 2002

(30) Foreign Application Priority Data

Feb. 28, 2001 (KR) .................................. 10-2001-10356

(51) Int. Cl.[7] .............................................. G06F 13/28
(52) U.S. Cl. ............................. 710/28; 710/23; 710/52
(58) Field of Search ..................................... 710/22–28

(56) References Cited

U.S. PATENT DOCUMENTS

| | | | | |
|---|---|---|---|---|
| 5,260,942 A | * | 11/1993 | Auerbach et al. | 370/474 |
| 5,379,381 A | * | 1/1995 | Lamb | 395/275 |
| 5,513,320 A | * | 4/1996 | Young et al. | 395/200 |
| 5,696,989 A | * | 12/1997 | Miura et al. | 395/844 |
| 5,805,816 A | * | 9/1998 | Picazo, Jr. et al. | 395/200 |
| 5,859,853 A | * | 1/1999 | Carlson | 370/468 |
| 6,260,081 B1 | | 7/2001 | Magro et al. | 710/22 |
| 6,330,623 B1 | | 12/2001 | Wu et al. | 710/23 |

FOREIGN PATENT DOCUMENTS

| | | | | |
|---|---|---|---|---|
| KR | 1995-1517 | 2/1995 | .......... | H04L/12/56 |

* cited by examiner

*Primary Examiner*—Kim Huynh
*Assistant Examiner*—Alan S Chen
(74) *Attorney, Agent, or Firm*—F. Chau & Associates LLC

(57) ABSTRACT

The communication system stores packet data received via a plurality of communication channels in a memory or transmits packet data stored in the memory through the communication channels includes buffer descriptors in which information on packet data is stored. The system comprises a central processing unit (CPU) which stores the information on packet data in the buffer descriptors and indicates whether each of the buffer descriptors is being organized, whether an error occurred in packet data received, or whether the organization of each of the buffer descriptors is completed by allotting a flag bit to each of the buffer descriptors. The system comprises a direct memory access (DMA) controller which stops processing a buffer descriptor currently being accessed and accesses a next buffer descriptor, or processes packet data information stored in the buffer descriptor currently being accessed, after identifying the flag bit of the buffer descriptor currently being accessed.

13 Claims, 6 Drawing Sheets

COMMUNICATION SYSTEM FOR RAISING CHANNEL UTILIZATION RATE AND COMMUNICATION METHOD THEREOF

BACKGROUND OF THE INVENTION

1. Field of the Invention

The present invention relates to a communication system, and more particularly, to a communication system for raising channel utilization rate and a communication method of the communication system for transmitting/receiving data via a plurality of communication channels.

2. Description of the Related Art

A direct memory access (DMA) controller can be used for transmitting/receiving data quickly without interference from a central processing unit (CPU) in a communication system. The DMA controller stores data received in terms of a packet unit via communication channels in a memory or transmits data stored in a memory to communication channels in terms of a packet unit. To do so, the DMA controller accesses buffer descriptors in the memory. The buffer descriptors comprise organized information on packets to be transmitted/received by the CPU via communication channels. A buffer descriptor can store information on one packet.

A start buffer descriptor pointer in the DMA controller can be set by the CPU. The DMA controller successively accesses buffer descriptors starting with a first buffer descriptor that is pointed to by the start buffer descriptor pointer and then processes packet data.

FIG. 1 is a diagram illustrating an embodiment of a buffer descriptor constituted by the CPU. Referring to FIG. 1, a buffer descriptor can include a data pointer DP, an ownership bit O, a command bit C, a status bit S, and a next buffer descriptor pointer NBDP.

The data pointer DP indicates the address in the memory at which packet data received via communication channels will be stored or the address in the memory at which packet data to be transmitted to communication channels is recorded. The ownership bit O indicates whether or not the buffer descriptor is in a CPU mode, where the buffer descriptor can be accessed by the CPU, or in a DMA mode, where the buffer descriptor can be accessed by the DMA controller. The command bit C indicates a packet data processing command. The status bit indicates the status after transmitting/receiving packet data and the type of errors in a case where errors occur. The next buffer descriptor pointer NDBP points to the next buffer descriptor to be accessed by the DMA controller.

Hereinafter, a method for processing packet data of the DMA controller accessing the buffer descriptor shown in FIG. 1 will be described.

As described above, the start buffer descriptor pointer in the DMA controller can be set by a CPU. For the convenience of explanation, suppose that the start buffer descriptor pointer of the DMA controller points to a first buffer descriptor 10_0. The DMA controller accesses the first buffer descriptor 10_0 pointed to by the start buffer descriptor pointer, and determines whether the ownership bit O indicates that the buffer descriptor is in the CPU mode or the DMA mode.

The CPU mode is a mode in which the CPU is organizing the buffer descriptor for transmitting/receiving data. After the buffer descriptor is organized, the CPU sets the ownership bit O so that the mode of the buffer descriptor is converted into the DMA mode. The DMA controller identifies the ownership bit O of the first buffer descriptor 10_0. At this time, if the ownership bit O is set (or reset), the DMA controller transmits packet data received from communication channels to a memory address pointed to by the data pointer DP and converts the mode of the buffer descriptor into the CPU mode by resetting the ownership bit O. If the mode of the buffer descriptor is converted into the CPU mode, the CPU can store information on new packet data in a buffer descriptor.

The DMA controller identifies the next buffer descriptor pointer NBDP and accesses a buffer descriptor pointed to by the next buffer descriptor pointer NBDP. At this time, if the next buffer descriptor pointer NBDP of the first buffer descriptor 10_0 indicates an address "104h", the DMA controller accesses a buffer descriptor 20_0 having a start address of "104h".

If the ownership bit O of the first buffer descriptor to be accessed by the DMA controller is not set yet, in other words, if the first buffer descriptor 10_0 is in the CPU mode, the DMA controller waits until the first buffer descriptor 10_0 is organized and the CPU has set the ownership bit O to indicate the DMA mode.

FIG. 2 is a diagram illustrating another embodiment of a buffer descriptor constituted by a CPU. Compared to the buffer descriptor of FIG. 1, the buffer descriptor shown in FIG. 2 does not have a next buffer descriptor. A DMA controller for accessing the buffer descriptor of FIG. 2 has a start buffer descriptor pointer for pointing to a buffer descriptor that will be accessed first and a current buffer descriptor pointer for pointing to a buffer descriptor that is currently being accessed. The initial value of the current buffer descriptor pointer is the same as that of the start buffer descriptor pointer.

Referring to FIG. 2, in the case where the start buffer descriptor pointer of the DMA controller points to an address "100h", the DMA controller accesses a first buffer descriptor 20_0 and identifies whether the first buffer descriptor 20_0 is in the CPU mode or the DMA mode. After completing data processing of the first buffer descriptor 20_0, the DMA controller changes the value of the current buffer descriptor pointer by adding an address corresponding to the size of a buffer descriptor to the value of the current buffer descriptor pointer. Accordingly, the value of the current buffer descriptor pointer of the DMA controller is changed from "100h" to "102h", and then the DMA controller accesses a second buffer descriptor 20 _2.

In the case of the buffer descriptor shown in FIG. 2, since the DMA controller adds an address, whose value is the size of a buffer descriptor, to the value of the current buffer descriptor pointer, it is possible to find the address to be accessed next. After all of the buffer descriptors from the first buffer descriptor 20_0 to an n-th buffer descriptor 20_n are sequentially processed, the current buffer descriptor pointer of the DMA controller becomes the start buffer descriptor pointer, and the DMA controller accesses the first buffer descriptor 20_0 and processes packet data according to information stored in the first buffer descriptor 20_0.

As described above, each of the buffer descriptors shown in FIGS. 1 and 2 has an ownership bit O for indicating whether or not the DMA controller is accessible. If a buffer descriptor to be accessed is in the CPU mode after the DMA controller identifies the ownership bit O, the DMA controller cannot process packet data transmitted/received via communication channels and waits for the buffer descriptor to change into the DMA mode.

In a communication system that receives packet data via two or more communication channels, if an error occurs in the received packet data due to the occurrence of errors in one of the two or more communication channels, the CPU resets (or sets) the ownership bit O of the buffer descriptor to the CPU mode. Thus, the DMA controller cannot access the buffer descriptor. Therefore, it is possible to prevent packet data received through the communication channels with errors from being transmitted to the memory via the DMA controller. At this time, the DMA controller waits for the buffer descriptor to be accessible. In other words, the DMA controller waits for the buffer descriptor to be in the DMA mode. When the DMA controller is on standby, packet data transmitted/received via other communication channels cannot be processed.

In a communication system that transmits/receives packet data via two or more communication channels, if an error occurs in one of the communication channels, and thus the DMA controller is in a standby mode, the DMA controller cannot process packet data transmitted via error-free communication channels.

Therefore, a need exists for a system and method for temporarily by-passing communication channel with error.

SUMMARY OF THE INVENTION

To solve the above problems, it is a first object of the present invention to provide a communication system which is capable of increasing channel utilization rate by processing packet data transmitted/received via communication channels, which are error-free, with the use of a direct memory access (DMA) controller even when errors occur in one or more communication channels in a multi-channel communication system.

It is a second object of the present invention to provide a communication method performed in the above communication system.

Accordingly, to achieve the first object, there is provided a communication system, which stores packet data received via a plurality of channels in a memory or transmits packet data stored in a memory to the plurality of communication channels, including: a plurality of buffer descriptors in which information on packet data received or transmitted via the plurality of communication channels is stored; a central processing unit (CPU) which stores the information on packet data in each of the plurality of buffer descriptors and indicates whether or not one of the buffer descriptors is being organized, whether or not an error occurs in packet data received via the plurality of communication channels, or whether or not the organization of each of the buffer descriptors is completed by allotting a flag bit to each of the buffer descriptors; and a direct memory access (DMA) controller which stops processing one of the buffer descriptors currently being accessed and then accesses the next buffer descriptor, or processes packet data according to information stored in the buffer descriptor currently being accessed, after identifying the flag bit of each of the buffer descriptors.

To achieve the second object, there is provided a communication method performed in a communication system, which includes a CPU which stores information on packet data received/transmitted via a plurality of communication channels in each of the plurality of buffer descriptors and includes a DMA controller which stores packet data received via the plurality of communication channels in the memory or transmits packet data stored in a memory via the plurality of communication channels, the communication method including: (a) displaying the current status of the buffer descriptor using flag bits; (b) determining whether or not the CPU is organizing a buffer descriptor to be processed by the DMA controller, whether or not errors occur in the packet data received via the communication channels, or whether or not the DMA controller is accessible after the organization of the buffer descriptor is completed by the CPU, by using the DMA controller to identify the flag bit; (c) continuously identifying the flag bit using the DMA controller until the organization of the buffer descriptor to be accessed is completed if the CPU is organizing the buffer descriptor to be accessed in step (b); (d) skipping the buffer descriptor currently being accessed if it is determined that errors occur in the communication channels in step (b), and performing step (b) again to process the next buffer descriptor; (e) processing packet data whose information is stored in the buffer descriptor currently being accessed if the buffer descriptor currently being accessed is in a DMA mode, in which the DMA controller can access the buffer descriptor, in step (b); and (f) converting the mode of the buffer descriptor processed in step (e) into a CPU mode in which the CPU can access the buffer descriptor, and moving to a buffer descriptor to be processed next.

According to an embodiment of the present invention, a buffer descriptor is provided which stores packet data information. The buffer descriptor comprises an ownership bit for indicating that the buffer descriptor is in a central processing unit (CPU) mode the buffer descriptor is being organized or an error occurred in packet data, and for indicating that the buffer descriptor is in a direct memory access (DMA) mode, in which a DMA controller is accessible, if the organization of the buffer descriptors is completed. The buffer descriptor further comprises a skip bit for indicating whether a CPU is organizing the buffer descriptor or whether an error occurred in packet data received via a communication channel. The buffer descriptor comprises a status bit which indicates a status after a communication system transmits/receives packet data, a data pointer which indicates an address in a memory in which packet data is stored or the address in the memory at which packet data to be transmitted through the communication channel is recorded, and a command bit which indicates a packet data processing command.

The status bit indicates a type of error.

The buffer descriptor comprises a next buffer descriptor pointer (NBDP), which indicates a next buffer descriptor to be accessed the DMA controller.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF PREFERRED EMBODIMENTS

The present invention will now be described more fully with reference to the accompanying drawings, in which preferred embodiments of the invention are shown.

Figure 1:
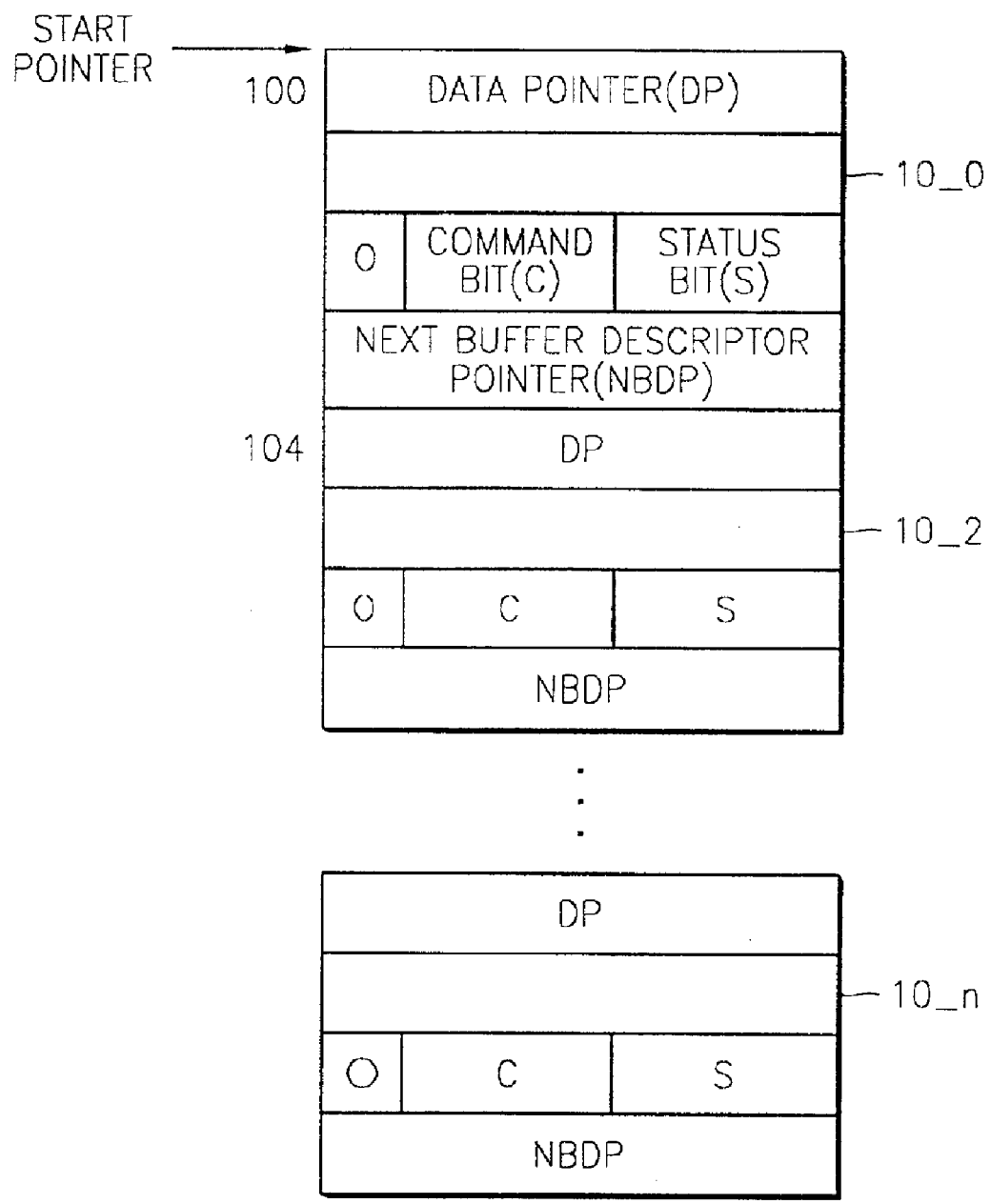
FIG. 1 is a diagram illustrating an embodiment of a conventional buffer descriptor constituted by a CPU.
Figure 2:
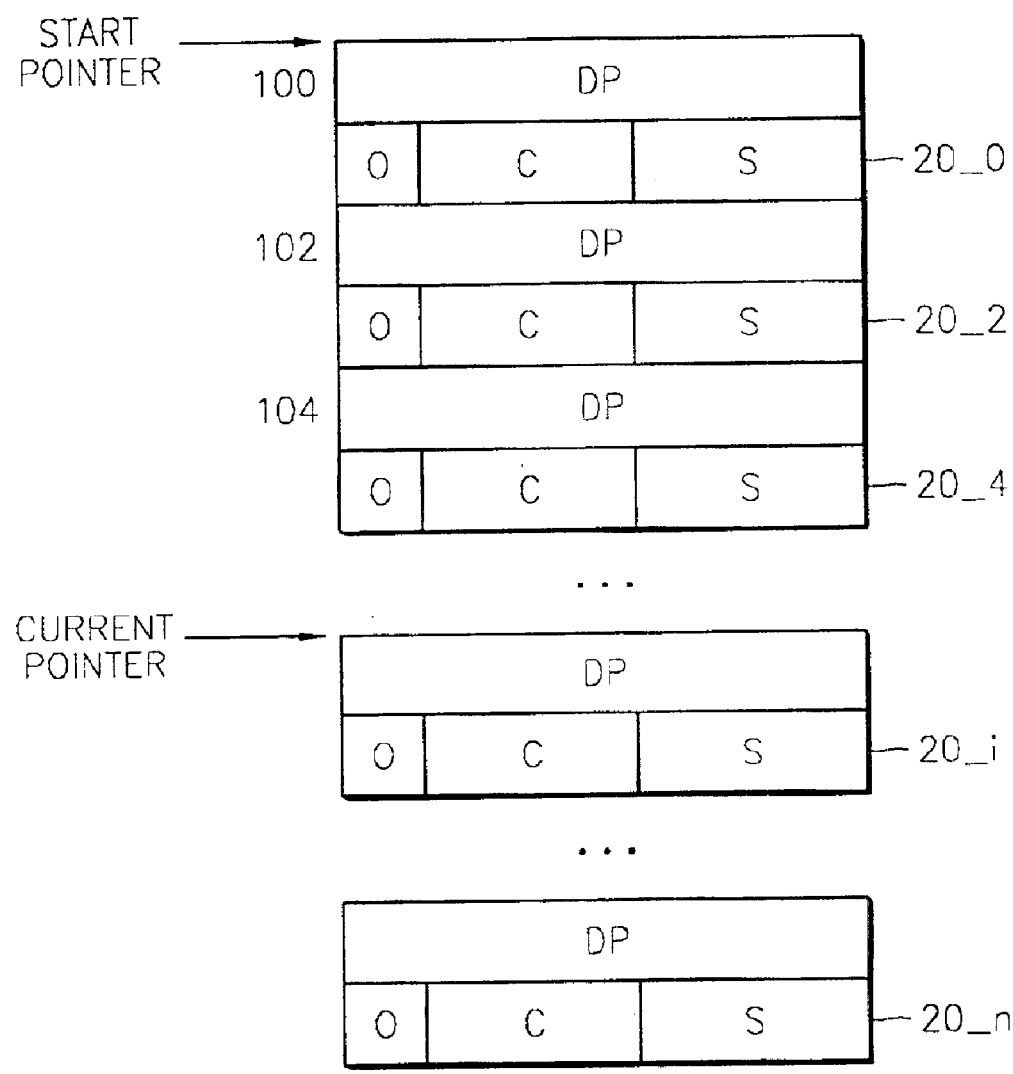
FIG. 2 is a diagram illustrating another embodiment of a conventional buffer descriptor constituted by a CPU.
Figure 3:
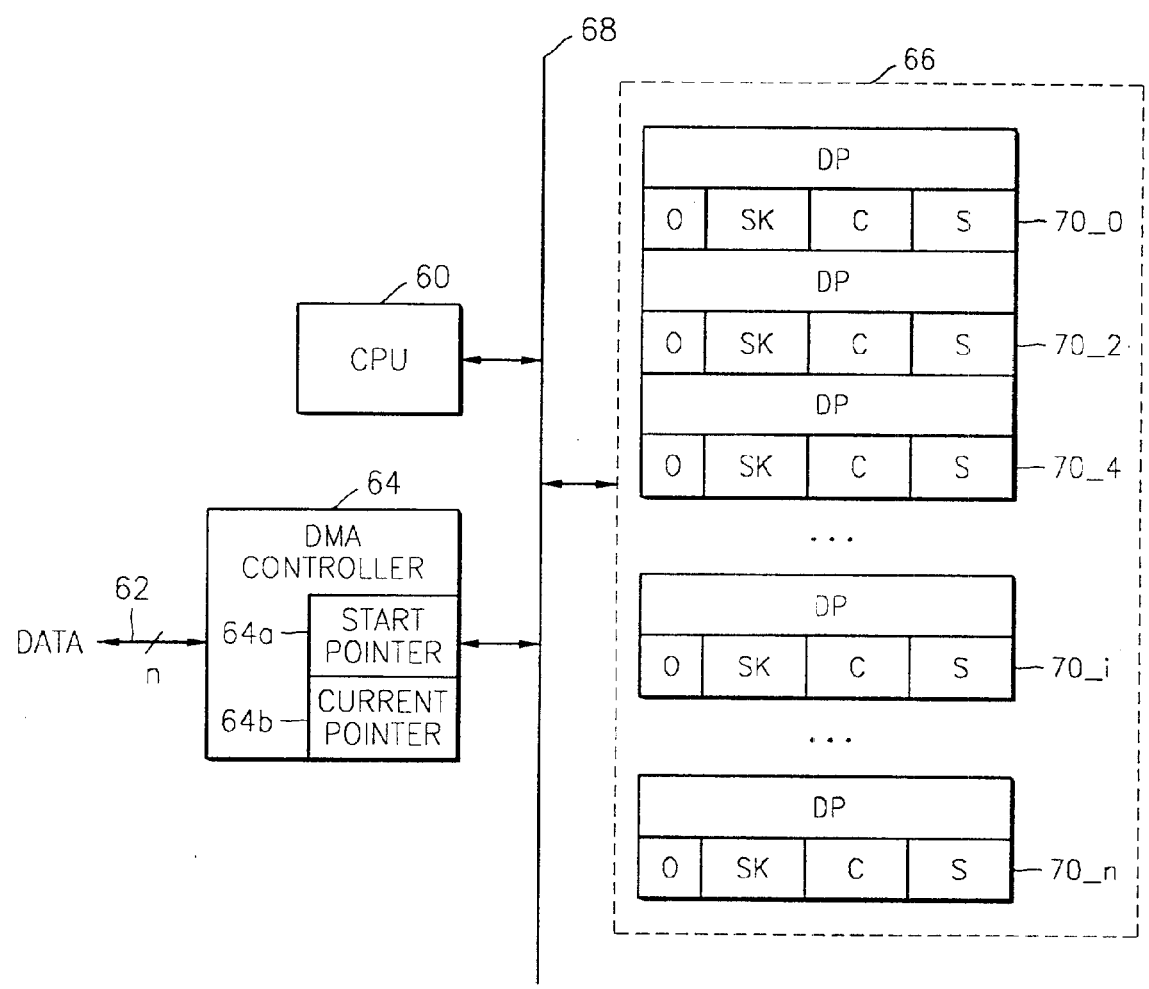
FIG. 3 is a diagram illustrating a communication system, which is capable of raising channel utilization rate according to the present invention.

FIG. 3 is a diagram illustrating a communication system for raising channel utilization rate according to the present invention. The communication system according to the invention includes a CPU 60, a direct memory access (DMA) controller 64, and a plurality of buffer descriptors 66. The buffer descriptors 66 occupy a portion of a memory in which packet data are stored. In FIG. 3, a system bus 68 is illustrated with the communication system, and data transmission between the CPU 60 or the DMA controller 64 and the buffer descriptors 66 is carried out through the system bus 68.

Referring to FIG. 3, information on packet data received or transmitted in terms of a packet unit via communication channels 62 is stored in the buffer descriptors 66 by the CPU 60. A packet of information can be stored in one buffer descriptor. Each of the buffer descriptor, for example, 70_i, is comprised of a data pointer DP, a command bit C, and a flag bit comprised of a status bit S, an ownership bit O and a skip bit SK.

The CPU 60 organizes the buffer descriptors 66 in an area of the memory in which packet data is stored. Organizing the buffer descriptors 66 comprises the CPU 60 storing information on packet data transmitted/received via the communication channels. The CPU 60 allots the flag bit to each of the buffer descriptors and indicates a current status of each buffer descriptor using the flag bit. In other words, using the flag bit, the CPU 60 can indicate whether the buffer descriptors 66 are being organized by the CPU 60, whether an error occurred in packet data received via the communication channels 62, or whether the organization of the buffer descriptors 66 is completed.

The CPU 60 allots two bits to the flag bit. A first bit is allotted to the ownership bit O, and a second bit is allotted to the skip bit SK.

The ownership bit O indicates whether the buffer descriptor is in a CPU mode or a DMA mode. For example, in a case where the CPU 60 is organizing buffer descriptor 70_2, or an error has occurred in packet data received via the communication channels 62, the CPU 60 sets (or resets) the ownership bit O indicating that the buffer descriptor 70_2 is currently in the CPU mode. If the buffer descriptor is in the CPU mode, the DMA controller 64 cannot access the buffer descriptor. Also, after the buffer descriptor is organized, the CPU 60 resets (or sets) the ownership bit O of the buffer descriptor indicating that the buffer descriptor is in the DMA mode, after which the DMA controller 64 can access the buffer descriptor.

The skip bit SK indicates whether the CPU is organizing the buffer descriptor or whether an error occurred in packet data received via the communication channels 62. If an error occurs in packet data received via the communication channels 62, the CPU resets the skip bit SK.

The DMA controller 64 has a start pointer 64a and a current pointer 64b. The start pointer 64a is set by the CPU 60 and indicates a buffer descriptor accessed first by the DMA controller 64. The current pointer 64b indicates a buffer descriptor that is currently being accessed by the DMA controller 64 and initially has the same value as the initial value of the start pointer 64a. The current pointer 64b updates its current value by adding an address corresponding to the size of a unit buffer descriptor to the current value of the current pointer 64b. Therefore, the initial value of the current pointer 64b of the DMA controller 64 indicates a first buffer descriptor 70 and is equal to the value of the start pointer 64a at first. Then the current pointer 64b sequentially indicates second through n-th buffer descriptor 70_2 through 70_n. The DMA controller 64 sequentially processes the first through n-th buffer descriptor, 70_0 through 70_n, following the current pointer 64b.

After identifying the flag bit of each of the buffer descriptors 66, the DMA controller 64 stops processing a buffer descriptor currently being accessed and then accesses the next buffer descriptor. Alternatively, the DMA controller 64 processes packet data transmitted/received via the communication channels 62 using information stored in a buffer descriptor currently being accessed. Processing packet data comprises transmitting packet data received from the communication channels 62 to the memory or transmitting packet data stored in the memory to the communication channels 62.

Figure 4:
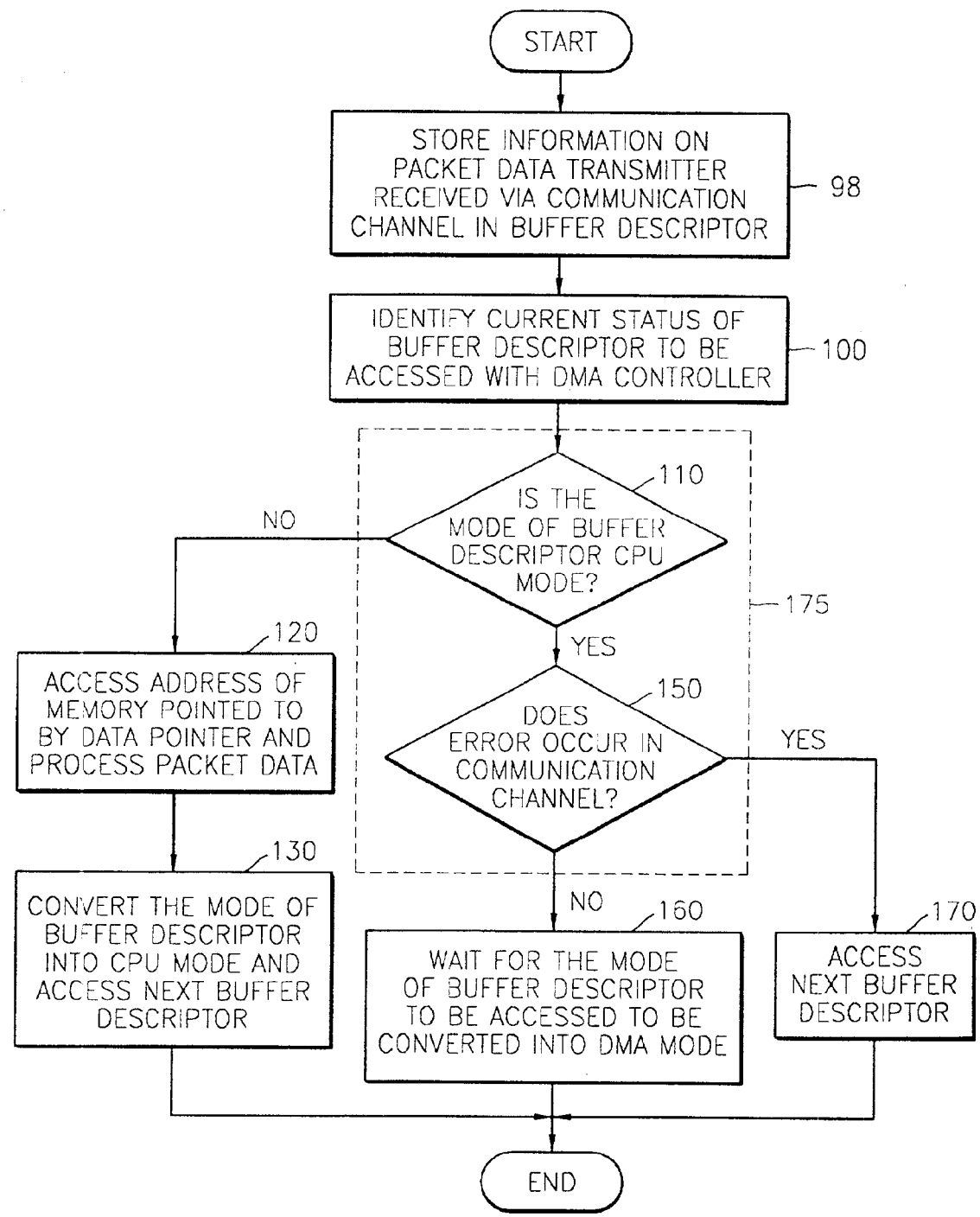
FIG. 4 is a flow chart illustrating an embodiment of a communication method performed in the communication system of FIG. 3.

FIG. 4 is a flow chart illustrating a communication method according to an embodiment of the present invention, performed in the communication system shown in FIG. 3. Referring to FIGS. 3 and 4, the CPU 60 stores information on packet data transmitted/received via the communication channels 62 comprised of n channels in the buffer descriptors 66 in block 98. Information on one packet is stored in one buffer descriptor, and the CPU 60 allots a flag bit to each of the buffer descriptors. Each flag bit indicates the status of a buffer descriptor and is comprised of two bits. The flag bit indicates whether the CPU 60 is storing information on packet data in a buffer descriptor, whether an error occurred in the communication channels 62 through which the packet data currently being stored has been received, or whether storing the information on the packet data is completed.

The DMA controller 64 accesses a buffer descriptor pointed to by the current pointer 64b in block 100. For the convenience of explanation, suppose that the current pointer 64b points to an i-th buffer descriptor, 70_i.

The DMA controller 64 identifies the flag bit of the i-th buffer descriptor 70_i to be accessed to determine the current status of the i-th buffer descriptor 70_i currently being accessed in block 175. In other words, the DMA controller 64 identifies whether information on packet data is being stored in the i-th buffer descriptor 70_i, whether an error occurred in the communication channels 62 through which the packet data being stored has been received, or whether storing the information on the packet data is completed.

Specifically, the DMA controller 64 identifies the ownership bit O of the flag bit and determines whether the i-th buffer descriptor 70_i is in the CPU mode or the DMA mode in which storing the information on the packet data is completed, in block 110. For example, if the ownership bit O has been set, the DMA controller 64 determines that the i-th buffer descriptor 70_i is in the CPU mode. If the ownership bit O has been reset, the DMA controller 64 determines that the i-th buffer descriptor 70_i is in the DMA mode.

In the block 110, if the i-th buffer descriptor 70_i is in the CUP mode, the method determines in block 150 whether information on packet data received via the communication channels 62 is being stored in the i-th buffer descriptor 70_i or whether an error occurred in the communication channels 62 through which the packet data has been received. For example, if the skip bit SK has been set, the DMA controller 64 determines that errors have occurred in the communication channels 62. If the skip bit SK has been reset, the DMA controller 64 determines that the packet data received via the communication channels 62 is being stored in the i-th buffer descriptor 70_i.

If the i-th buffer descriptor 70_i being accessed by the DMA controller 64 in block 175 is identified as being in the DMA mode, the packet data stored in the i-th buffer descriptor 70_i is processed in block 120. Processing packet data comprises the DMA controller 64 storing packet data in the memory at an address pointed to by the data pointer DP of the i-th buffer descriptor 70_i, or the DMA controller 64 transmitting packet data stored in a memory at an address pointed to by the data pointer DP of the i-th buffer descriptor 70_i to the communication channels 62.

After the packet data stored in the i-th buffer descriptor 70_i is processed, the DMA controller 64 converts the mode of the i-th buffer descriptor 70_i into the CPU mode and accesses the next buffer descriptor in block 130. In other words, after completing processing of the packet data stored in the i-th buffer descriptor 70_i, the DMA controller 64 sets the ownership bit O, and thus, converts the mode of the i-th buffer descriptor 70_i into the CPU mode. If the ownership bit O is set, the CPU stores information on new packet data in the i-th buffer descriptor 70_i. Also, after processing the packet data stored in the i-th buffer descriptor 70_i, the current pointer 64b of the DMA controller 64 points to an i-th+1 buffer descriptor. The DMA controller 64 accesses the i-th+1 buffer descriptor referring to the current pointer 64b.

If it is determined that the CPU 60 is storing information on packet data transmitted to/received from one of the communication channels 62 in the i-th buffer descriptor 70_i, the DMA controller 64 waits for the CPU 60 to complete storing the information on packet data in the i-th buffer descriptor 70_i in block 160.

If it is determined that an error occurred in the packet data, the information of which is currently being stored in the block 175, the DMA controller 64 stops processing the i-th buffer descriptor 70_i currently being accessed and accesses the i-th+1 buffer descriptor, which is the next buffer descriptor, in block 170. In other words, if it turns out that an error occurred in the communication channels 62 transmitting/receiving packet data to be processed through identification of the skip bit SK, the DMA controller 64 stops processing the buffer descriptor currently being accessed. The DMA controller 64 accesses another stored buffer descriptor in which information on packet data transmitted/received via an error-free communication channel and processes the packet data.

As described above, the communication system according to the present invention allots the skip bit SK to communication channels in a case where the CPU 60 organizes a buffer descriptor. The DMA controller 64 can determine whether an error occurred in a communication channel transmitting/receiving packet data to be processed through the skip bit SK. In other words, in a case where an error occurs in a communication channel transmitting/receiving packet data to be processed, the DMA controller 64 processes another packet data to be transmitted/received via another communication channel that is error-free, thereby effectively enhancing the communication channel utilization rate.

Figure 5:
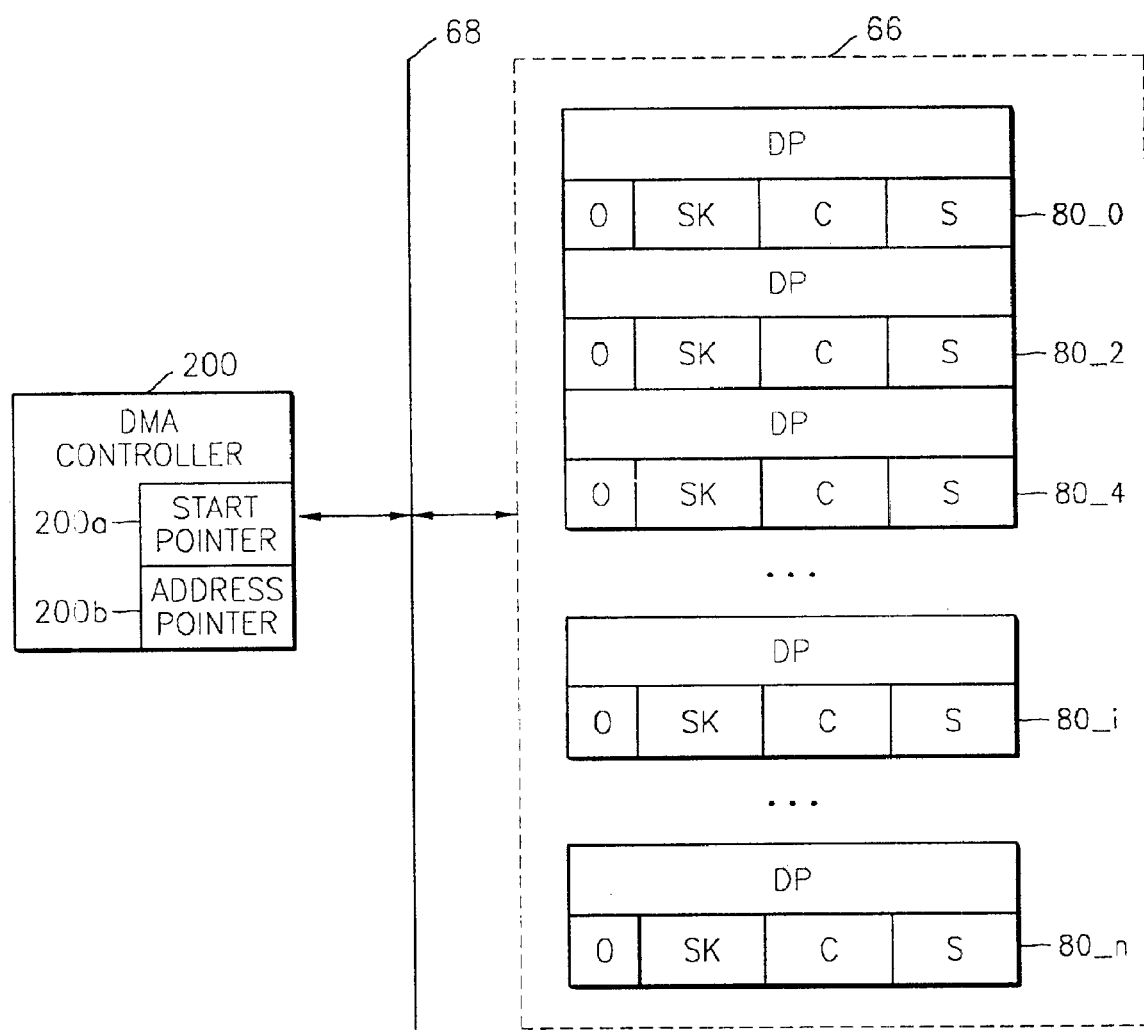
FIG. 5 is a diagram illustrating another embodiment of the DMA controller of the communication system of FIG. 3.

FIG. 5 is a diagram illustrating another embodiment of the DMA controller 64 shown in FIG. 3. For the convenience of explanation, buffer descriptors 66 are illustrated with a system bus 68 in FIG. 5.

A DMA controller 200 comprises a start pointer 200a and an address counter 200b. The start pointer 200a is set by the CPU 60 and points to a buffer descriptor to be accessed first by the DMA controller 64. The address counter 200b counts the start address of a buffer descriptor currently being accessed by the DMA controller 200 and is initialized to a value pointed to by the start pointer 200a. In other words, the address counter 200b determines the start address of a buffer descriptor to be accessed next by adding an address corresponding to the size of a unit buffer descriptor to the start address of a buffer descriptor previously processed.

Specifically, the DMA controller 200 accesses a first buffer descriptor 80 pointed to by the start pointer 200a first. For example, in the case where the start pointer 200a indicates an address "100h", the DMA controller 200 accesses the address 100h and processes packet data. After processing the packet data of the first buffer descriptor 80, the address counter 200b counts "104h", which is the start address of a buffer descriptor to be accessed next and is determined by adding an address (for example, "004h") corresponding to the size of a unit buffer descriptor to the current value of the address counter 200b. The DMA controller 200 accesses a second buffer descriptor 82 following the address counter 200b.

In a case where the DMA controller 200 determines the start address of a buffer descriptor to be processed next by using the address counter 200b, the DMA controller 64 manages only the start pointer 200a, and thus the programming can be simplified.

A method of processing packet data using the buffer descriptors 66 of the DMA controller 200 is similar to the method described above with reference to FIG. 4.

Figure 6:
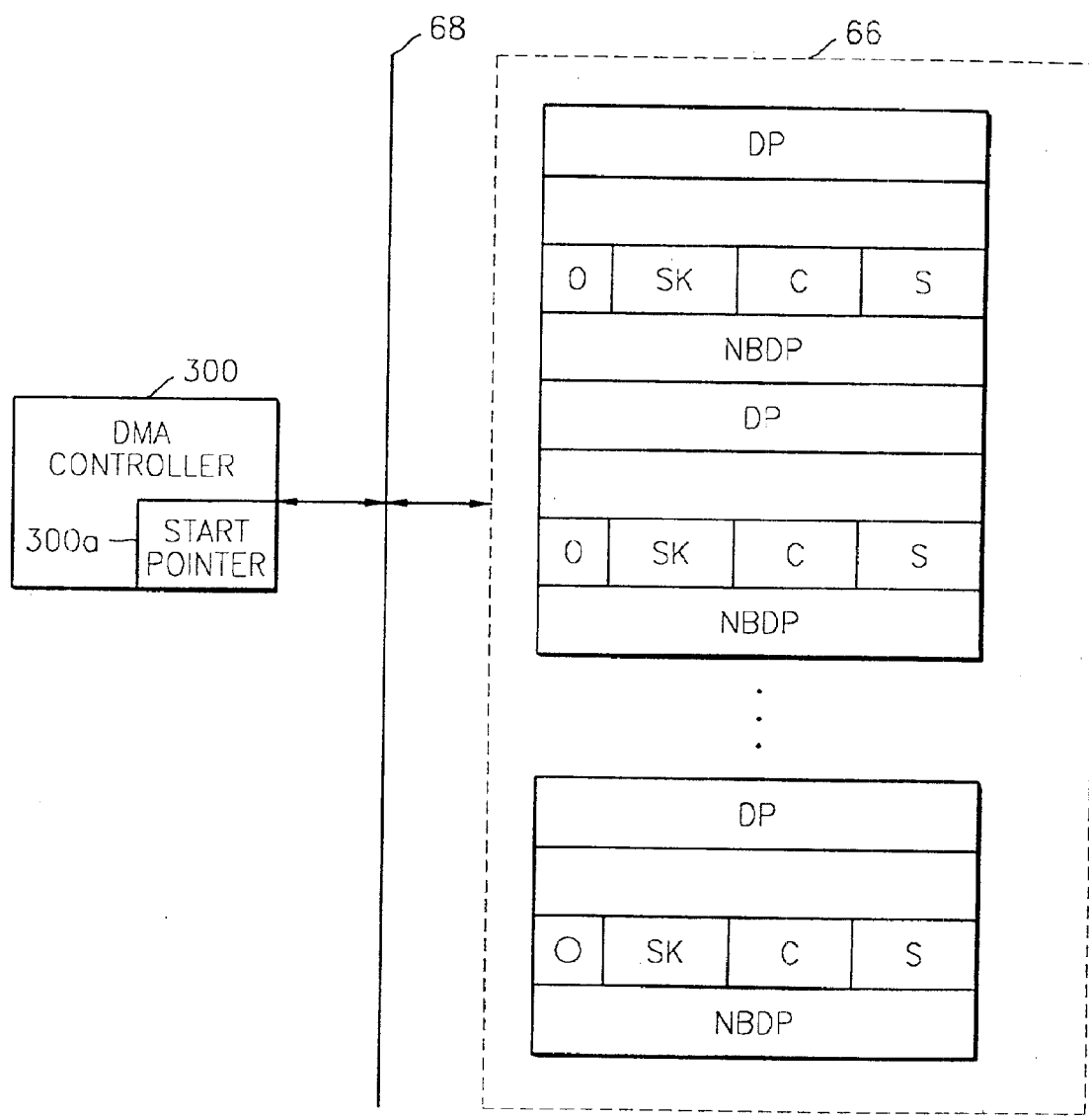
FIG. 6 is a diagram illustrating another embodiment of the buffer descriptor of the communication system of FIG. 3 and a direct memory access (DMA) controller accessing the buffer descriptor.

FIG. 6 is a diagram illustrating another embodiment of buffer descriptors 66 and a DMA controller 300 accessing the buffer descriptors. Referring to FIGS. 3 and 6, each buffer descriptor comprises a data pointer DP, a command bit C, a status bit S, a next buffer descriptor pointer NBDP, and a flag bit comprised of an ownership bit O and a skip bit SK. The next buffer descriptor pointer NBDP indicates a buffer descriptor to be accessed next by the DMA controller 300. Each of the buffer descriptors 66 has a next buffer descriptor pointer NBDP, and thus a DMA controller 300 may have a start pointer 300a that indicates a buffer descriptor to be accessed first by the DMA controller 300 and is set by the CPU 60.

A method for processing packet data using the buffer descriptors 66 of FIG. 6 is similar to the method described above with reference to FIG. 4.

The following table shows the probability of receiving consecutive frames through a communication channel in a case where the probability of error in the communication channel is 5% or 10%.

TABLE 1

| Number of consecutive frames | Probability of receiving frames through a communication channel having 5% probability of error occurrence | Probability of receiving frames through a communication channel having 10% probability of error occurrence |
|---|---|---|
| 10 | 60% | 35% |
| 20 | 35% | 12.3% |
| 50 | 8% | 0.5% |
| 100 | 0.64% | 0.003% |

Referring to Table 1, as the number of consecutive frames that can be received via the communication channel with a probability of error occurrence of 5 or 10% increases, the probability of the consecutive frames being received through the communication channel decreases. The decrease in received consecutive frames means that the probability of error occurrence in packet data received via the communication channel is high.

The Table 2 shows the channel utilization rates of the prior art and the present invention in a case where 10 frames are consecutively received via communication channels having an error occurrence probability of 5%.

TABLE 2

| Number of channels | Channel utilization rate (Prior Art) | Channel utilization rate (Present invention) |
|---|---|---|
| 2 | 36% | 84% |
| 3 | 22% | 93% |
| 5 | 8% | 99% |
| 10 | 0.64% | 100% |

Referring to Table 2, in the prior art, if an error occurs in one of communication channels, other channels cannot be used because of the one communication channel with an error. Accordingly, as the number of communication channels increases, the channel utilization rate decreases. However, in the present invention, even if an error occurs in one or more communication channels, packet data received via other communication channels which are error-free can be processed. Thus, in the present invention, as the number of communication channels increases, the channel utilization rate increases.

In the drawings and specification, there have been disclosed preferred embodiments of the invention and, although specific terms are employed, they are used in a generic and descriptive sense only and not for purposes of limitation, the scope of the invention being set forth in the following claims.

As described above, according to the communication system for raising channel utilization rate and a communication method thereof, even though an error may occur in one or more communication channels in the communication system transmitting/receiving packet data via a plurality of communication channels, a DMA controller can process packet data received via other communication channels which are error-free, thereby enhancing the channel utilization rate.

What is claimed is:

1. A communication system which stores packet data received via a plurality of channels in a memory or transmits packet data stored in a memory through the plurality of communication channels, the communication system comprising:

a plurality of buffer descriptors in which information on packet data received or transmitted via the plurality of communication channels is stored;

a central processing unit (CPU) which stores the information on packet data in each of the plurality of buffer descriptors, and allots a flag bit to each buffer descriptor indicating whether a buffer descriptor is being organized, whether an error occurred in packet data received via the plurality of communication channels, or whether the organization of each of the buffer descriptors is completed; and a direct memory access (DMA) controller which determines the flag bit allotted by the central processing unit, and according to the flag bit, stops processing a buffer descriptor currently being accessed and accesses a next buffer descriptor, or processes packet data according to information stored in the buffer descriptor currently being accessed, wherein the flag bit comprises an ownership bit for indicating that the buffer descriptor is in a CPU mode if each of the buffer descriptors is being organized or an error occurred in packet data received via the communication channels, and for indicating that the buffer descriptor is in a DMA mode, in which the DMA controller is accessible, if the organization of each of the buffer descriptors is completed, and a skip bit for indicating whether the CPU is organizing the buffer descriptor or whether or not an error occurred in packet data received via the communication channels.

2. The communication system of claim 1, wherein the CPU allots a next buffer descriptor pointer to each of the buffer descriptors, and the DMA controller accesses the next buffer descriptor based on an identification of the next buffer descriptor pointer allotted to the buffer descriptor currently being accessed.

3. The communication system of claim 1, wherein if processing of the buffer descriptor currently being accessed is completed, the DMA controller updates a value of a current pointer for indicating which buffer descriptor the DMA controller is currently accessing by adding an address corresponding to the size of a buffer descriptor to the value of the current pointer.

4. The communication system of claim 1, wherein the DMA controller comprises:

a start pointer for indicating a buffer descriptor to be accessed first; and an address counter, which is initialized to the value of the start pointer, for counting the start address of the buffer descriptor to be accessed next, wherein the address counter updates the value of the address counter by adding an address corresponding to the size of a unit buffer descriptor to the value of the address counter.

5. A communication method performed in a communication system, which includes a CPU which stores information on packet data received/transmitted via a plurality of communication channels in each buffer descriptor and includes a DMA controller which stores packet data received via the plurality of communication channels in a memory or transmits packet data stored in the memory via the plurality of communication channels, the communication method comprising:

(a) displaying a current status of a buffer descriptor using a flag bit, wherein the flag bit is allotted to the buffer descriptor by the CPU;

(b) determining whether the CPU is organizing a buffer descriptor to be processed by the DMA controller, whether error occurred in the packet data transmitted via the communication channels, or whether the DMA controller is accessible after the organization of the buffer descriptor is completed, by using the DMA controller to identify the flag bit;

(c) continuously identifying the flag bit using the DMA controller until the organization of the buffer descriptor to be accessed is completed if the CPU is organizing the buffer descriptor to be accessed in step (b);

(d) skipping the buffer descriptor currently being accessed if it is determined that error occurred in the communication channels in step (b), and performing step (b) again to process the next buffer descriptor;

(e) processing packet data whose information is stored in the buffer descriptor currently being accessed if the buffer descriptor currently being accessed is in a DMA mode, in which the DMA controller can access the buffer descriptor, in step (b); and (f) converting the buffer descriptor processed in step (e) from the DMA mode into a CPU mode in which the CPU can access the buffer descriptor, and moving to a buffer descriptor to be processed next.

6. The communication method of claim 5, wherein the flag bit comprises:

an ownership bit for indicating that the buffer descriptor is in the CPU mode if the buffer descriptor is being organized by the CPU or an error occurred in packet data received via the communication channels, and for indicating that the buffer descriptor is in the DMA mode, in which the DMA controller is accessible, if the organization of the buffer descriptor is completed; and a skip bit for indicating whether the CPU is organizing each of the buffer descriptor or whether or not an error occurred in packet data received via the communication channels.

7. The communication method of claim 6, wherein step (b) comprises:

(b1) identifying whether the buffer descriptor to be processed is in the CPU mode or the DMA mode with the DMA controller using the ownership bit;

(b2) performing step (e) if the buffer descriptor to be processed is determined to be in the DMA mode and identifying the skip bit if the buffer descriptor to be processed is determined to be in the DMA mode; and (b3) performing step (d) if it is determined that error occurred in the communication channels based on the identification of the skip bit and performing step (c) if it is determined that the CPU is organizing the buffer descriptor to be processed based on the identification of the skip bit.

8. The communication method of claim 5, wherein the CPU allots a next buffer descriptor pointer to each of the buffer descriptors, and the DMA controller accesses the buffer descriptor to be processed next based on the identification of the next buffer descriptor pointer allotted to each of the buffer descriptor.

9. The communication method of claim 5, wherein if processing the buffer descriptor currently being accessed is completed, the DMA controller updates the value of a current pointer for indicating which buffer descriptor the DMA controller is currently accessing by adding an address corresponding to the size of a unit buffer descriptor to the value of the current pointer.

10. The communication method of claim 5, further comprising the steps of:

indicating a buffer descriptor to be accessed first according to a start pointer; and initializing an address counter to the value of the start pointer, for counting the start address of the buffer descriptor, wherein the address counter updates the value of the address counter by adding an address corresponding to the size of a unit buffer descriptor to the value of the address counter.

11. A buffer descriptor for storing packet data information comprising:

an ownership bit for indicating that the buffer descriptor is in a central processing unit (CPU) mode the buffer descriptor is being organized or an error occurred in packet data, and for indicating that the buffer descriptor is in a direct memory access (DMA) mode, in which a DMA controller is accessible, if the organization of the buffer descriptors is completed;

a skip bit for indicating whether a CPU is organizing the buffer descriptor or whether an error occurred in packet data received via a communication channel;

a status bit for indicating a status after a communication system transmits/receives packet data;

a data pointer for indicating an address in a memory in which packet data is stored or the address in the memory at which packet data to be transmitted through the communication channel is recorded; and a command bit for indicating a packet data processing command.

12. The buffer descriptor of claim 11, wherein the status bit indicates a type of error.

13. The buffer descriptor of claim 11, further comprising a next buffer descriptor pointer (NBDP) for indicating a next buffer descriptor to be accessed the DMA controller.

* * * * *